United States Patent
Maiolo

(10) Patent No.: US 9,987,695 B2
(45) Date of Patent: Jun. 5, 2018

(54) BAND SAW BLADE WITH REPEATING BACK EDGE PATTERN AND RELATED METHOD

(71) Applicant: Irwin Industrial Tool Company, Huntersville, NC (US)

(72) Inventor: Joseph F Maiolo, Chicopee, MA (US)

(73) Assignee: Irwin Industrial Tool Company, Huntersville, NC (US)

( * ) Notice: Subject to any disclaimer, the term of this patent is extended or adjusted under 35 U.S.C. 154(b) by 176 days.

(21) Appl. No.: 14/919,807

(22) Filed: Oct. 22, 2015

(65) Prior Publication Data
US 2016/0114416 A1    Apr. 28, 2016

Related U.S. Application Data

(60) Provisional application No. 62/068,098, filed on Oct. 24, 2014.

(51) Int. Cl.
*B23D 61/12*    (2006.01)

(52) U.S. Cl.
CPC .................................. *B23D 61/123* (2013.01)

(58) Field of Classification Search
CPC .. B23D 61/123; B23D 53/005; B23D 53/001; B23D 53/008; B23D 53/08; B23D 53/082; Y10T 83/9317; B27B 33/806
See application file for complete search history.

(56) References Cited

U.S. PATENT DOCUMENTS

| | | | | |
|---|---|---|---|---|
| 1,850,478 A | * | 3/1932 | Schaefer | B23D 61/123 83/847 |
| 4,160,397 A | * | 7/1979 | Bertini | B23D 61/123 125/18 |
| 4,195,543 A | * | 4/1980 | Tapply | B23D 55/082 76/112 |
| 4,205,571 A | | 6/1980 | Bertini | |

(Continued)

FOREIGN PATENT DOCUMENTS

| | | |
|---|---|---|
| EP | 1795289 | 6/2007 |
| EP | 2848346 | 3/2015 |
| WO | 2014007743 | 1/2014 |

OTHER PUBLICATIONS

Extended European Search Report for EP Application No. 15191315.9 dated Feb. 26, 2016. (6 pgs.).

*Primary Examiner* — Jennifer Swinney
(74) *Attorney, Agent, or Firm* — Eversheds Sutherland (US) LLP

(57) ABSTRACT

A band saw blade may include a cutting edge defining a cutting plane and configured to engage a workpiece during movement of the band saw blade in a cutting direction, and a back edge located on an opposite side of the band saw blade relative to the cutting edge and defining a repeating back edge pattern. The back edge pattern may include, in sequential order, a ramp-down section defining an acute ramp-down angle relative to a plane parallel to the cutting plane, a first ramp-up section defining a first acute ramp-up angle relative to the plane parallel to the cutting plane, an intermediate section oriented at least substantially parallel to the cutting plane, a second ramp-up section defining a second acute ramp-up angle relative to the plane parallel to the cutting plane, and a spacing section oriented at least substantially parallel to the cutting plane.

17 Claims, 6 Drawing Sheets

(56) References Cited

U.S. PATENT DOCUMENTS

| | | | |
|---|---|---|---|
| 4,423,653 A | 1/1984 | Brewster | |
| 4,603,613 A * | 8/1986 | Wilson | B23D 61/123 83/635 |
| 2012/0055313 A1* | 3/2012 | Nagano | B23D 61/121 83/835 |
| 2015/0075346 A1* | 3/2015 | Kullmann | B23D 61/123 83/661 |

* cited by examiner

BAND SAW BLADE WITH REPEATING BACK EDGE PATTERN AND RELATED METHOD

CROSS-REFERENCE TO RELATED APPLICATIONS

The present application claims priority to and the benefit of U.S. Provisional Application No. 62/068,098, filed on Oct. 24, 2014, entitled "BAND SAW BLADE WITH REPEATING BACK EDGE PATTERN AND RELATED METHOD," which is hereby incorporated herein by reference in its entirety.

FIELD OF THE DISCLOSURE

The present disclosure relates generally to a band saw blade and a method for cutting a workpiece using the band saw blade and more particularly to a band saw blade that defines a repeating back edge pattern and a method for cutting a workpiece using the band saw blade.

BACKGROUND

Various types of band saw blades are known in the art for cutting workpieces formed of various types of materials. A band saw blade generally may be formed as a continuous band including a cutting edge and a back edge located on an opposite side of the band saw blade relative to the cutting edge. The cutting edge may be configured to engage a workpiece, and the back edge may be configured to engage spaced rollers of a band saw machine. During operation of the band saw machine, the band saw blade may move in a cutting direction, and the rollers may apply pressure to the back edge as the opposing cutting edge cuts through the workpiece.

According to certain band saw blade configurations, the cutting edge and the back edge may be substantially parallel to one another along the total circumferential length of the band saw blade. In this manner, the height of the band saw blade may be substantially constant along the total circumferential length of the band saw blade, and the pressure applied to the back edge via the rollers may cause the cutting edge to engage the workpiece with a substantially constant cutting force as the band saw blade moves in the cutting direction. Although band saw blades configured in this manner may be suitable for many applications, it may be difficult to use these types of band saw blades to cut workpieces formed of certain types of materials, including, for example, materials that have a propensity to work-harden during cutting. One example of such a material is Inconel® 718, which is sold by Special Metals Corporation of New Hartford, N.Y., U.S.A.

According to other band saw blade configurations, the back edge may be contoured such that the cutting edge and the back edge are not parallel to one another along certain portions of the total circumferential length of the band saw blade. For example, the back edge may include one or more sections along which the height of the band saw blade increases and one or more sections along which the height of the band saw blade decreases. In this manner, the pressure applied to the back edge via the rollers may cause the cutting edge to engage the workpiece with a varying cutting force as the band saw blade moves in the cutting direction. Although band saw blades configured in this manner may be suitable for certain applications, it still may be difficult to use these types of band saw blades to cut workpieces formed of certain types of materials, including, for example, materials that have a propensity to work-harden during cutting. Additionally, use of such band saw blades may generate significant noise or "squealing," particularly when one of the rollers engages a section of the back edge along which the height of the band saw blade increases.

BRIEF DESCRIPTION OF THE DRAWINGS

The detailed description is set forth with reference to the accompanying drawings. The use of the same reference numerals may indicate similar or identical items. Various embodiments may utilize elements and/or features other than those illustrated in the drawings, and some elements and/or features may not be present in various embodiments. Elements and/or features in the drawings are not necessarily drawn to scale. Throughout this disclosure, depending on the context, singular and plural terminology may be used interchangeably.

DETAILED DESCRIPTION OF EXAMPLE EMBODIMENTS

Overview

Figure 1:
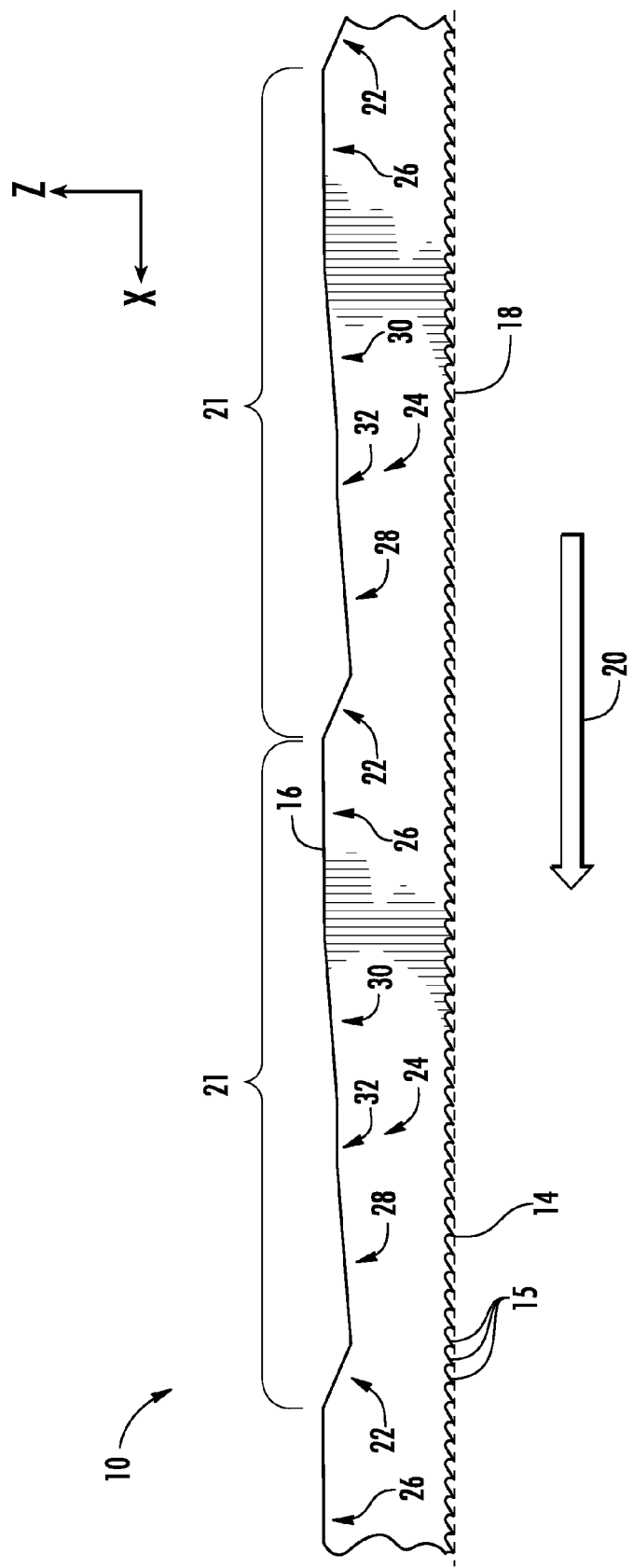
FIG. 1 is a side elevation view of a portion of a band saw blade in accordance with one or more embodiments of the disclosure.

Described below are example embodiments of a band saw blade as well as individual features of the band saw blade. The band saw blade may be used with a band saw machine to cut a workpiece. As described below, the band saw blade may be configured to provide enhanced cutting performance when used to cut workpieces, including workpieces formed of various types of materials, such as materials that have a propensity to work-harden during cutting. Additionally, as described below, in certain example embodiments, the band saw blade may be configured to reduce the level of noise or squealing generated during use of the band saw blade to cut a workpiece.

Generally described, the band saw blade may include a cutting edge defining a cutting plane and configured to engage a workpiece during movement of the band saw blade in a cutting direction, and a patterned back edge located on an opposite side of the band saw blade relative to the cutting edge and configured to engage spaced rollers of the band saw machine. In certain example embodiments, the pattern of the back edge is a repeating back edge pattern.

In certain example embodiments, the back edge pattern may include, in sequential order, a ramp-down section having a ramp-down length and defining an acute ramp-down angle relative to a plane parallel to the cutting plane, a first ramp-up section having a first ramp-up length and defining a first acute ramp-up angle relative to the plane parallel to the cutting plane, an intermediate section having an intermediate length and oriented at least substantially parallel to the cutting plane, a second ramp-up section having a second ramp-up length and defining a second acute ramp-up angle relative to the plane parallel to the cutting plane, and a spacing section having a spacing length and oriented at least substantially parallel to the cutting plane.

In certain example embodiments, a sum of the first ramp-up length, the intermediate length, and the second ramp-up length may be greater than the ramp-down length. In certain example embodiments, a sum of the first ramp-up length, the intermediate length, and the second ramp-up length may be greater than the spacing length. In certain example embodiments, the spacing length may be greater than the ramp-down length. In certain example embodiments, the first ramp-up length may be equal to or substantially equal to the second ramp-up length. In certain example embodiments, the ramp-down length may be equal to or substantially equal to the intermediate length. In certain example embodiments, the acute ramp-down angle may be greater than each of the first acute ramp-up angle and the second acute ramp-up angle. In certain example embodiments, the first acute ramp-up angle may be equal to or substantially equal to the second acute ramp-up angle.

In certain example embodiments, the ramp-down section may extend from a leading end of the back edge pattern to a leading end of the first ramp-up section, the first ramp-up section may extend from a trailing end of the ramp-down section to a leading end of the intermediate section, the intermediate section may extend from a trailing end of the first ramp-up section to a leading end of the second ramp-up section, the second ramp-up section may extend from a trailing end of the intermediate section to a leading end of the spacing section, and the spacing section may extend from a trailing end of the second ramp-up section to a trailing end of the back edge pattern.

In certain example embodiments, the band saw blade may have a first height at the leading end of the ramp-down section, the band saw blade may have a second height at the trailing end of the ramp-down section and the leading end of the first ramp-up section, the band saw blade may have a third height at the trailing end of the first ramp-up section, along the intermediate section, and at the leading end of the second ramp-up section, and the band saw blade may have a fourth height at the trailing end of the second ramp-up section and along the spacing section. The first height may be equal to or substantially equal to the fourth height, the first height may be greater than each of the second height and the third height, and the third height may be greater than the second height.

In certain example embodiments, the back edge pattern may include, in sequential order, a ramp-down section having a ramp-down length and defining an acute ramp-down angle relative to a plane parallel to the cutting plane, a ramp-up section having a ramp-up length and defining an acute ramp-up angle relative to the plane parallel to the cutting plane, and a spacing section having a spacing length and oriented at least substantially parallel to the cutting plane. The ramp-up section may be positioned adjacent to the ramp-down section, and the spacing section may be positioned adjacent to the ramp-up section. The ramp-up length and the spacing length each may be greater than the ramp-down length.

In certain example embodiments, the ramp-up section may include a first ramp-up subsection having a first ramp-up length and defining a first acute ramp-up angle relative to the plane parallel to the cutting plane, a second ramp-up subsection having a second ramp-up length and defining a second acute ramp-up angle relative to the plane parallel to the cutting plane, and an intermediate subsection extending between the first ramp-up subsection and the second ramp-up subsection and having an intermediate length. In certain example embodiments, the intermediate subsection may be oriented parallel or substantially parallel to the cutting plane. In certain example embodiments, the intermediate subsection may include a first part having a first intermediate length and defining a first acute intermediate angle relative to the plane parallel to the cutting plane, and a second part having a second intermediate length and defining a second acute intermediate angle relative to the plane parallel to the cutting plane. The first intermediate length may be equal to or substantially equal to the second intermediate length, and the first acute intermediate angle may be equal to or substantially equal to the second acute intermediate angle. In certain example embodiments, the ramp-down length may be equal to or substantially equal to the intermediate length. In certain example embodiments, the first ramp-up length may be equal to or substantially equal to the second ramp-up length, and the first acute ramp-up angle may be equal to or substantially equal to the second acute ramp-up angle.

In certain example embodiments, a total circumferential length of the band saw blade may be equal to or greater than approximately 10 feet (3.05 meters) and less than approximately 14 feet (4.27 meters), and the spacing length may be equal to or greater than the ramp-down length. In certain example embodiments, a total circumferential length of the band saw blade may be equal to or greater than approximately 10 feet (3.05 meters) and less than approximately 14 feet (4.27 meters), and the spacing length may be equal to or greater than approximately one-third of the ramp-up length and less than approximately one and one-half times the ramp-up length. In certain example embodiments, a total circumferential length of the band saw blade may be equal to or greater than approximately 14 feet (4.27 meters), and the spacing length may be equal to or greater than the ramp-down length.

These and other embodiments of the disclosure are described in more detail through reference to the accompanying drawings in the detailed description that follows. This brief overview, including section titles and corresponding summaries, is provided for the reader's convenience and is not intended to limit the scope of the claims or the preceding sections. Furthermore, the techniques described above and below may be implemented in a number of ways and in a number of contexts. Several example implementations and contexts are provided with reference to the accompanying drawings, as described below in more detail. However, the following implementations and contexts are but a few of many.

Illustrative Embodiments

Figure 2:
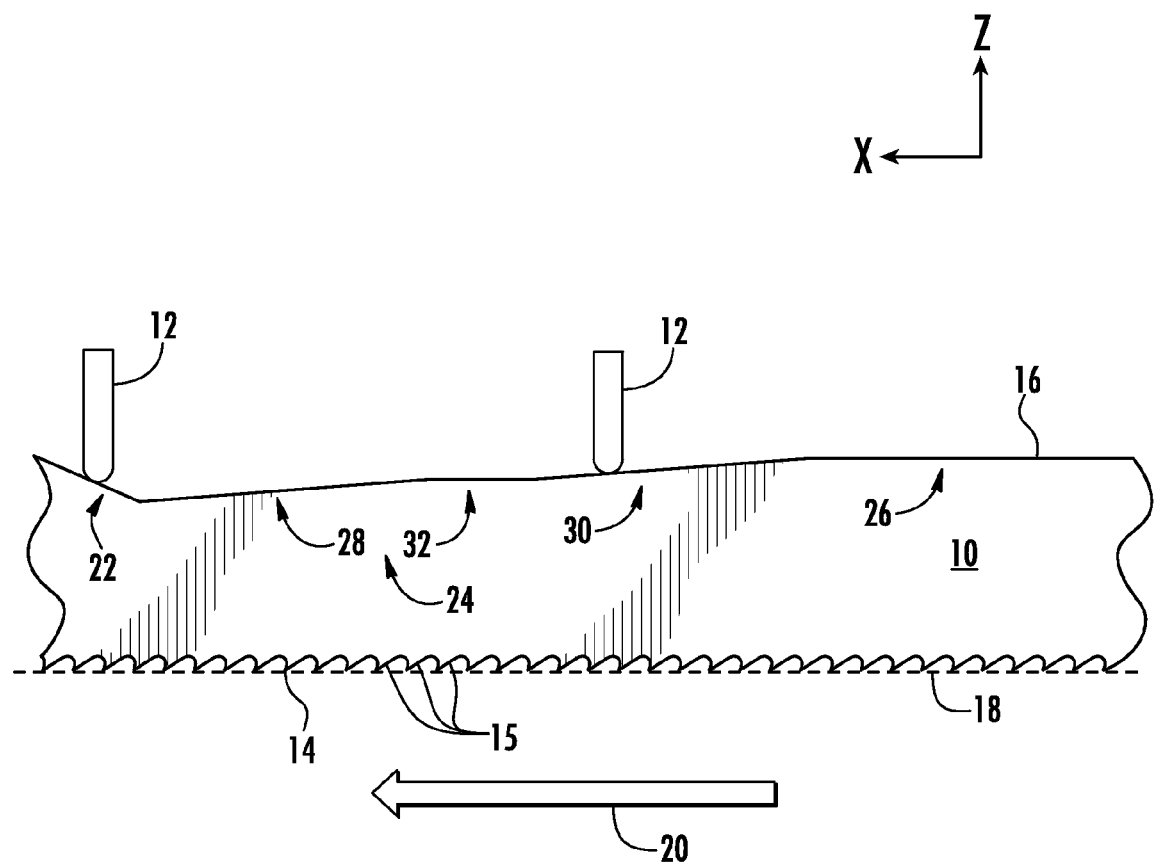
FIG. 2 is a side elevation view of a portion of the band saw blade of FIG. 1 and a pair of rollers of a band saw machine.

FIGS. 1-6 illustrate a band saw blade 10 (which also may be referred to simply as a "saw blade") in accordance with one or more example embodiments of the disclosure. The band saw blade 10 may be suitable for use in a band saw machine to cut a workpiece. In particular, as shown in FIG. 2, the band saw blade 10 may be configured to engage spaced rollers 12 of the band saw machine during movement of the band saw blade 10. As described below, the band saw blade 10 may be configured to provide enhanced cutting performance when used to cut workpieces, including workpieces formed of various types of materials that have a propensity to work-harden during cutting. Moreover, as described below, the band saw blade 10 may be configured to reduce the level of noise or squealing generated during use of the band saw blade 10 to cut the workpiece.

Certain features of the band saw blade 10 are described herein with reference to embodiments illustrated in the drawings; however, such features are not limited to the embodiments illustrated in the drawings. Certain features of the band saw blade 10 are described herein as having a length extending relative to an x-axis, a width extending relative to a y-axis, and/or a height extending relative to a z-axis. The respective axes are shown in the drawings with respect to the band saw blade 10.

Certain dimensions of the band saw blade 10 and features thereof are described herein using the term "approximately." As used herein, the term "approximately" indicates that each of the described dimensions is not a strict boundary or parameter and does not exclude functionally similar variations therefrom. Unless context or the description indicates otherwise, the use of the term "approximately" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

Certain relationships between dimensions of the band saw blade 10 and between features of the band saw blade 10 are described herein using the term "substantially." As used herein, the term "substantially equal" indicates that the equal relationship is not a strict relationship and does not exclude functionally similar variations therefrom. Unless context or the description indicates otherwise, the use of the term "substantially equal" in connection with two or more described dimensions indicates that the equal relationship between the dimensions includes variations that, using mathematical and industrial principles accepted in the art (e.g., rounding, measurement or other systematic errors, manufacturing tolerances, etc.), would not vary the least significant digit of the dimensions. As used herein, the term "substantially constant" indicates that the constant relationship is not a strict relationship and does not exclude functionally similar variations therefrom. Unless context or the description indicates otherwise, the use of the term "substantially constant" in connection with a described dimension indicates that the dimension includes variations that, using mathematical and industrial principles accepted in the art (e.g., rounding, measurement or other systematic errors, manufacturing tolerances, etc.), would not vary the least significant digit of the dimension. As used herein, the term "substantially parallel" indicates that the parallel relationship is not a strict relationship and does not exclude functionally similar variations therefrom.

The band saw blade 10 may be formed as a continuous (i.e., endless) band configured for use in a band saw machine. As shown, the band saw blade 10 may include a cutting edge 14 and a back edge 16 located on an opposite side of the band saw blade 10 relative to the cutting edge 14. The cutting edge 14 and the back edge 16 each may extend along a total circumferential length of the band saw blade 10. The cutting edge 14 may define a cutting plane 18 of the band saw blade 10, as shown, and the cutting edge 14 may be configured to engage a workpiece during movement of the band saw blade 10 in a cutting direction 20. In certain example embodiments, the entirety of the cutting edge 14 does not lie in a single plane. As shown, the cutting edge 14 may include a plurality of teeth 15 configured to engage and cut the workpiece as the band saw blade 10 moves in the cutting direction 20. It will be appreciated that the cutting direction 20 of the band saw blade 10 corresponds to the orientation of the teeth 15 of the cutting edge 14. In particular, as shown, rake faces of the teeth 15 generally may be oriented in the cutting direction 20, and clearance surfaces of the teeth 15 generally may be oriented in a direction opposite the cutting direction 20. In this manner, the teeth 15 may be oriented to cut the workpiece as the band saw blade 10 moves in the cutting direction 20. The teeth 15 may have a tooth form as illustrated in FIGS. 1-6, although other tooth forms may be used in various embodiments of the band saw blade 10. Additionally, the teeth 15 may be unset or set according to a defined set pattern in various embodiments of the band saw blade 10.

The back edge 16 of the band saw blade 10 may be configured to engage the spaced rollers 12 of the band saw machine. Although two rollers 12 are shown in FIG. 2, the band saw machine may include any number of rollers 12 that engage the back edge 16 of the band saw blade 10. As shown, the back edge 16 of the band saw blade 10 may include a repeating back edge pattern 21. In other words, the back edge 16 may include a plurality of the back edge patterns 21 arranged in a repeating serial manner along the circumferential length of the band saw blade 10. Although only two of the back edge patterns 21 are shown in FIG. 1, the back edge 16 of the band saw blade 10 may include three, four, five, six, seven, eight, nine, ten, or more back edge patterns 21 according to various example embodiments of the band saw blade 10. As shown, the back edge pattern 21 may include, in sequential order: (i) a relatively short ramp-down section 22; (ii) a relatively long ramp-up section 24; and (iii) a relatively long spacing section 26. In this manner, a height of the band saw blade 10 (i.e., the height-wise-extending distance between the cutting edge 14 and the back edge 16 of the band saw blade 10) may vary along the length of the back edge pattern 21. As shown, the sequential order of the ramp-down section 22, the ramp-up section 24, and the spacing section 26 may be arranged in a direction opposite the cutting direction 20. In other words, as the band saw blade 10 moves in the cutting direction 20 and the cutting edge 14 engages the workpiece, the ramp-down section 22 may be a leading section of the repeating back edge pattern 21, the ramp-up section 24 may trail the ramp-down section 22, and the spacing section 26 may trail the ramp-up section 24.

With respect to the cutting direction 20 of the band saw blade 10, the ramp-down section 22, the ramp-up section 24, and the spacing section 26 each may have a leading end and a trailing end. As shown, the trailing end of the ramp-down section 22 may be positioned adjacent to the leading end of the ramp-up section 24, and the trailing end of the ramp-up section 24 may be positioned adjacent to the leading end of the spacing section 26. In other words, the ramp-down section 22 may extend from the leading end of the back edge pattern 21 (and the trailing end of the preceding back edge pattern 21) to the leading end of the ramp-up section 24, the ramp-up section 24 may extend from the trailing end of the ramp-down section 22 to the leading end of the spacing section 26, and the spacing section 26 may extend from the trailing end of the ramp-up section 24 to the trailing end of the back edge pattern 21 (and the leading end of the succeeding back edge pattern 21).

As shown, the height of the band saw blade 10 may decrease from the leading end of the ramp-down section 22 to the trailing end of the ramp-down section 22, the height of the band saw blade 10 may increase from the leading end of the ramp-up section 24 to the trailing end of the ramp-up section 24, and the height of the band saw blade 10 may remain constant or substantially constant from the leading end of the spacing section 26 to the trailing end of the spacing section 26. In this manner, the band saw blade 10 may have a minimum height at the intersection of the trailing end of the ramp-down section 22 and the leading end of the ramp-up section 24, and the band saw blade 10 may have a maximum height along the spacing section 26.

The ramp-down section 22 may define at least one acute ramp-down angle $\alpha_{ARD}$ that is greater than zero degrees and less than 90 degrees relative to a plane oriented parallel to the cutting plane 18 and at least one obtuse ramp-down angle $\alpha_{ORD}$ that is greater than 90 degrees and less than 180 degrees relative to a plane oriented parallel to the cutting plane 18. As shown, the at least one acute ramp-down angle $\alpha_{ARD}$ and the at least one obtuse ramp-down angle $\alpha_{ORD}$ may be defined by a straight linear edge of the ramp-down section 22. The ramp-up section 24 may define at least one acute ramp-up angle $\alpha_{ARU1}$, $\alpha_{ARU2}$ that is greater than zero degrees and less than 90 degrees relative to a plane oriented parallel to the cutting plane 18 and at least one obtuse ramp-up angle $\alpha_{ORU1}$, $\alpha_{ORU2}$ that is greater than 90 degrees and less than 180 degrees relative to a plane oriented parallel to the cutting plane 18. As shown, the at least one acute ramp-up angle $\alpha_{ARU1}$, $\alpha_{ARU2}$ and the at least one obtuse ramp-up angle $\alpha_{ORU1}$, $\alpha_{ORU2}$ may be defined by a straight linear edge of the ramp-up section 24. The spacing section 26 may include a straight linear edge that is oriented at least substantially parallel (i.e., substantially parallel or parallel) to the cutting plane 18.

As shown, the ramp-up section 24 may include a first angled ramp-up subsection 28 (which also may be referred to as a "first ramp-up section"), a second angled ramp-up subsection 30 (which also may be referred to as a "second ramp-up section"), and an intermediate subsection 32 (which also may be referred to as an "intermediate section") positioned between the first angled ramp-up subsection 28 and the second angled ramp-up subsection 30. With respect to the cutting direction 20 of the band saw blade 10, the first angled ramp-up subsection 28, the second angled ramp-up subsection 30, and the intermediate subsection 32 each may have a leading end and a trailing end. As shown, the trailing end of the first angled ramp-up subsection 28 may be positioned adjacent to the leading end of the intermediate subsection 32, and the trailing end of the intermediate subsection 32 may be positioned adjacent to the leading end of the second angled ramp-up subsection 30. In other words, the first angled ramp-up subsection 28 may extend from the leading end of the ramp-up section 24 (and the trailing end of the ramp-down section 22) to the leading end of the intermediate subsection 32, the intermediate subsection 32 may extend from the trailing end of the first angled ramp-up subsection 28 to the leading end of the second angled ramp-up subsection 30, and the second angled ramp-up subsection 30 may extend from the trailing end of the intermediate subsection 32 to the trailing end of the ramp-up section 24 (and the leading end of the spacing section 26).

The first angled ramp-up subsection 28 may define a first acute ramp-up angle $\alpha_{ARU1}$ that is greater than zero degrees and less than 90 degrees relative to a plane oriented parallel to the cutting plane 18 and a first obtuse ramp-up angle $\alpha_{ORU1}$ that is greater than 90 degrees and less than 180 degrees relative to a plane oriented parallel to the cutting plane 18. As shown, the first acute ramp-up angle $\alpha_{ARU1}$ and the first obtuse ramp-up angle $\alpha_{ORU1}$ may be defined by a straight linear edge of the first angled ramp-up subsection 28. The second angled ramp-up subsection 30 may define a second acute ramp-up angle $\alpha_{ARU2}$ that is greater than zero degrees and less than 90 degrees relative to a plane oriented parallel to the cutting plane 18 and a second obtuse ramp-up angle $\alpha_{ORU2}$ that is greater than 90 degrees and less than 180 degrees relative to a plane oriented parallel to the cutting plane 18. As shown, the second acute ramp-up angle $\alpha_{ARU2}$ and the second obtuse ramp-up angle $\alpha_{ORU2}$ may be defined by a straight linear edge of the second angled ramp-up subsection 30. In certain example embodiments, as shown, the first acute ramp-up angle $\alpha_{ARU1}$ may be equal to or substantially equal to the second acute ramp-up angle $\alpha_{ARU2}$, and the first obtuse ramp-up angle $\alpha_{ORU1}$ may be equal to or substantially equal to the second obtuse ramp-up angle $\alpha_{ORU2}$. In other example embodiments, the first acute ramp-up angle $\alpha_{ARU1}$ may be different than (e.g., greater than or less than) the second acute ramp-up angle $\alpha_{ARU2}$, and the first obtuse ramp-up angle $\alpha_{ORU1}$ may be different than the second obtuse ramp-up angle $\alpha_{ORU2}$. In certain example embodiments, as shown, the acute ramp-down angle $\alpha_{ARD}$ may be greater than each of the first acute ramp-up angle $\alpha_{ARU1}$ and the second acute ramp-up angle $\alpha_{ARU2}$, and the obtuse ramp-down angle $\alpha_{ORD}$ may be less than each of the first obtuse ramp-up angle $\alpha_{ORU1}$ and the second obtuse ramp-up angle $\alpha_{ORU2}$.

In certain example embodiments, as shown in FIGS. 1-4, the intermediate subsection 32 may include a straight linear edge that is oriented at least substantially parallel (i.e., substantially parallel or parallel) to the cutting plane 18. In this manner, the height of the band saw blade 10 may remain constant or substantially constant from the leading end of the intermediate subsection 32 to the trailing end of the intermediate subsection 32.

Figure 5:
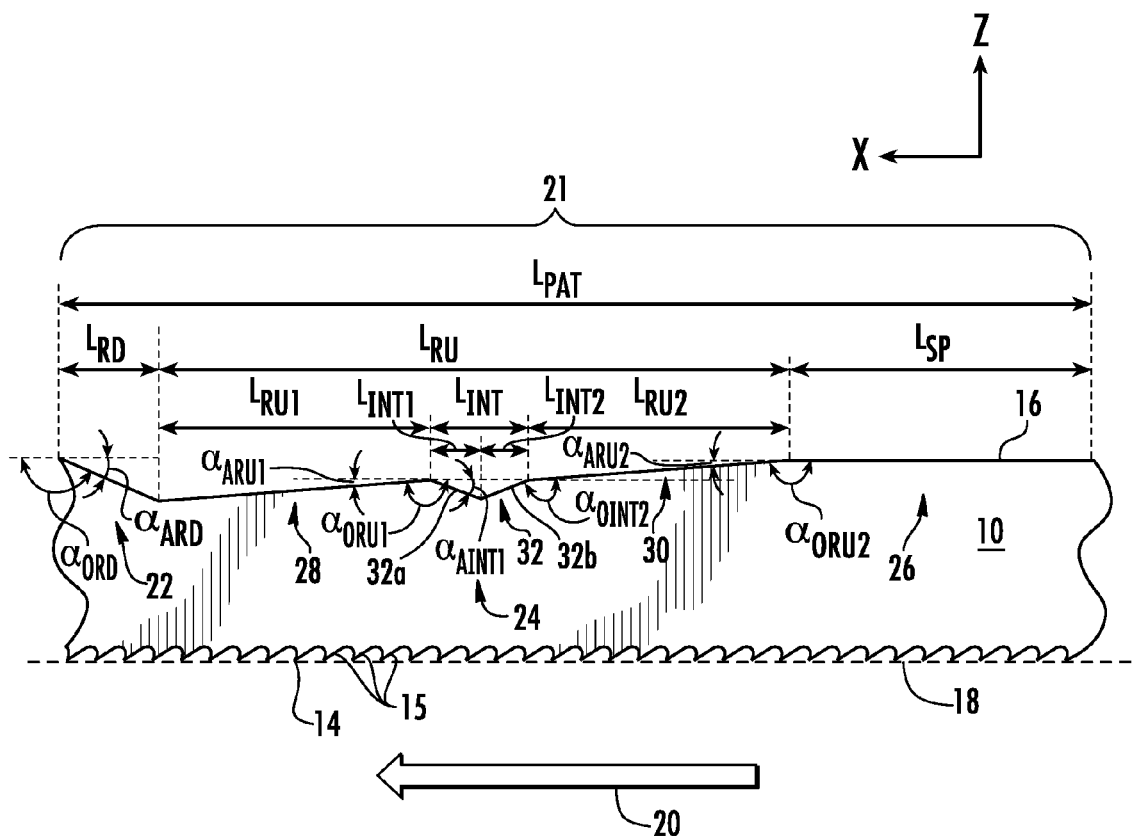
FIG. 5 is a side elevation view of a portion of a band saw blade in accordance with one or more embodiments of the disclosure.
Figure 6:
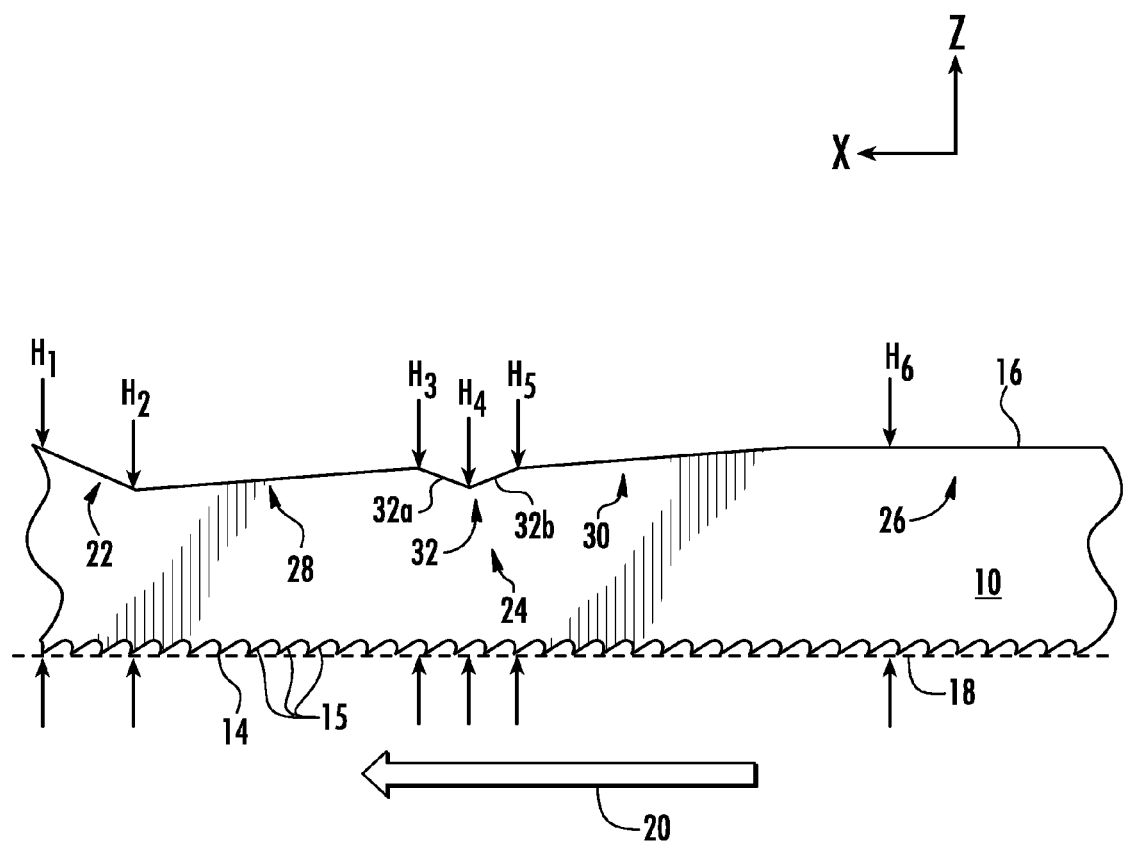
FIG. 6 is a side elevation view of a portion of the band saw blade of FIG. 5.

In other example embodiments, as shown in FIGS. 5 and 6, the intermediate subsection 32 may include a first part 32a (which also may be referred to as a "first intermediate part") and a second part 32b (which also may be referred to as a "second intermediate part") that collectively form a concave "V" shape along the back edge 16. With respect to the cutting direction 20 of the band saw blade 10, the first part 32a and the second part 32b each may have a leading end and a trailing end. As shown, the trailing end of the first part 32a may be positioned adjacent to the leading end of the second part 32b. In other words, the first part 32a may extend from the leading end of the intermediate subsection 32 (and the trailing end of the first angled ramp-up subsection 28) to the leading end of the second part 32b, and the second part 32b may extend from the trailing end of the first part 32a to the trailing end of the intermediate subsection 32 (and the leading end of the second angled ramp-up subsection 30).

The first part 32a may define a first acute intermediate angle $\alpha_{AINT1}$ that is greater than zero degrees and less than 90 degrees relative to a plane oriented parallel to the cutting plane 18 and a first obtuse intermediate angle $\alpha_{OINT1}$ that is greater than 90 degrees and less than 180 degrees relative to a plane oriented parallel to the cutting plane 18. As shown, the first acute intermediate angle $\alpha_{AINT1}$ and the first obtuse intermediate angle $\alpha_{OINT1}$ may be defined by a straight linear edge of the first part 32a. The second part 32b may define a second acute intermediate angle $\alpha_{AINT2}$ that is greater than zero degrees and less than 90 degrees relative to a plane oriented parallel to the cutting plane 18 and a second obtuse intermediate angle $\alpha_{OINT2}$ that is greater than 90 degrees and less than 180 degrees relative to a plane oriented parallel to the cutting plane 18. As shown, the second acute intermediate angle $\alpha_{AINT2}$ and the second obtuse intermediate angle $\alpha_{OINT2}$ may be defined by a straight linear edge of the second part 32b. In certain example embodiments, as shown, the first acute intermediate angle $\alpha_{AINT1}$ may be equal to or substantially equal to the second acute intermediate angle $\alpha_{AINT2}$, and the first obtuse intermediate angle $\alpha_{OINT1}$ may be equal to or substantially equal to the second obtuse intermediate angle $\alpha_{OINT2}$. In other example embodiments, the first acute intermediate angle $\alpha_{AINT1}$ may be different than the second acute intermediate angle $\alpha_{AINT2}$, and the first obtuse intermediate angle $\alpha_{OINT1}$ may be different than the second obtuse intermediate angle $\alpha_{OINT2}$.

Figure 3:
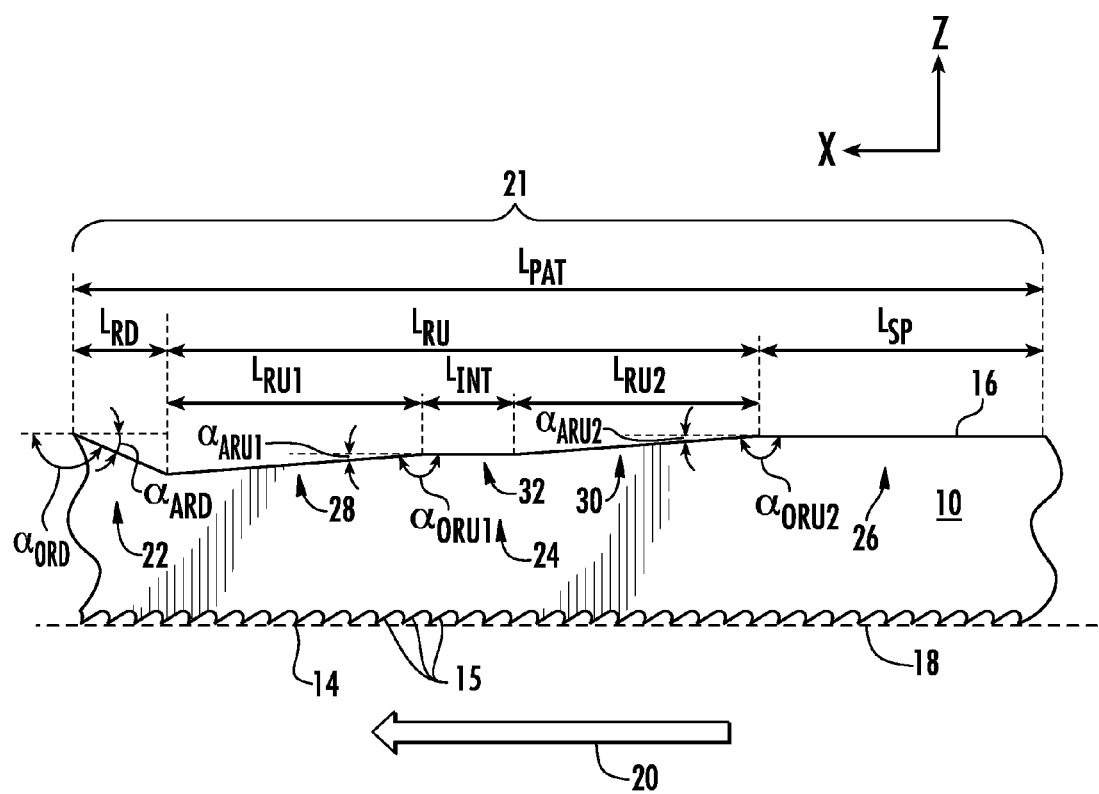
FIG. 3 is a side elevation view of a portion of the band saw blade of FIG. 1.
Figure 4:
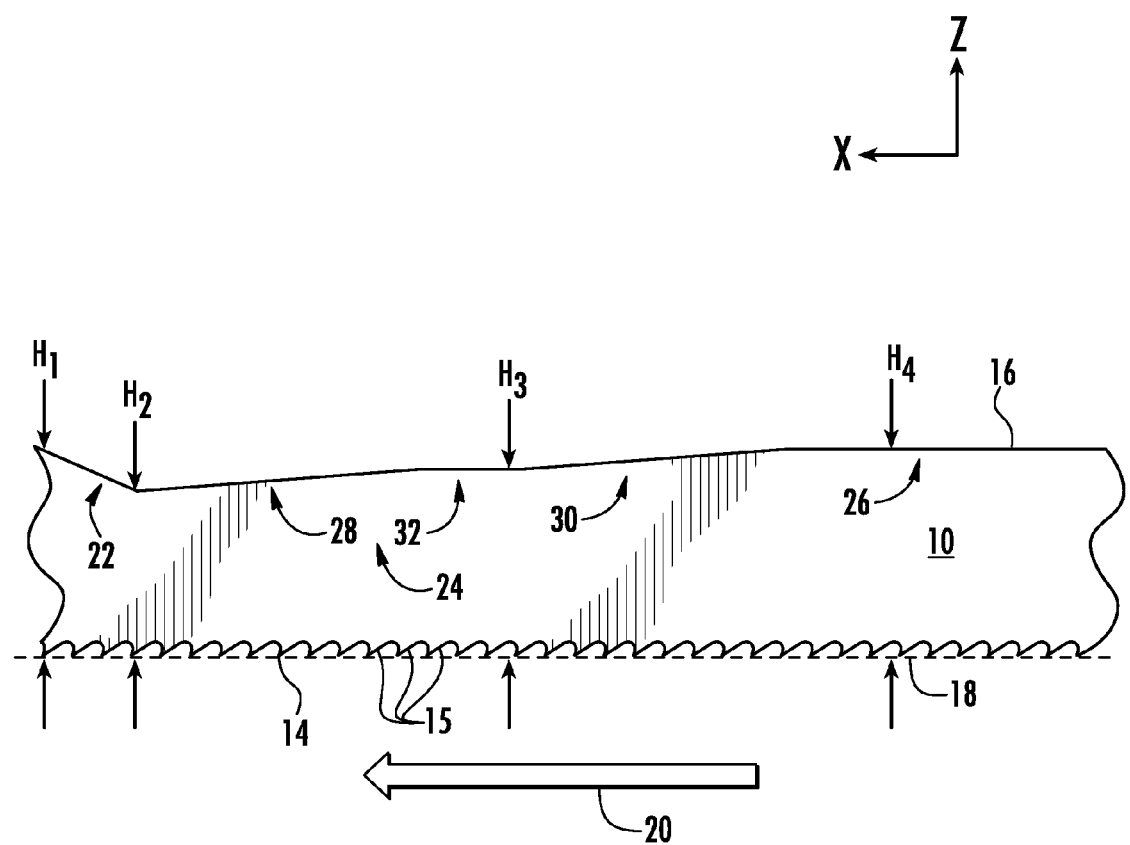
FIG. 4 is a side elevation view of a portion of the band saw blade of FIG. 1.

As shown in FIGS. 3 and 5, the ramp-down section 22 has a ramp-down length $L_{RD}$, the ramp-up section 24 has a ramp-up length $L_{RU}$, and the spacing section 26 has a spacing length $L_{SP}$. The back edge pattern 21 has a pattern length $L_{PAT}$ equal to the sum of the ramp-down length $L_{RD}$, the ramp-up length $L_{RU}$, and the spacing length $L_{SP}$. In certain example embodiments, as shown, the ramp-up length $L_{RU}$ and the spacing length $L_{SP}$ each may be greater than the ramp-down length $L_{RD}$. In certain example embodiments, as shown, the ramp-up length $L_{RU}$ may be greater than the spacing length $L_{SP}$. As shown, the first angled ramp-up subsection 28 has a first angled ramp-up length $L_{RU1}$, the second angled ramp-up subsection 30 has a second angled ramp-up length $L_{RU2}$, and the intermediate subsection 32 has an intermediate length $L_{INT}$. The ramp-up length $L_{RU}$ is equal to the sum of the first angled ramp-up length $L_{RU1}$, the second angled ramp-up length $L_{RU2}$, and the intermediate length $L_{INT}$. In certain example embodiments, as shown, the first angled ramp-up length $L_{RU1}$ may be equal to the second angled ramp-up length $L_{RU2}$. In other example embodiments, the first angled ramp-up length $L_{RU1}$ may be different than the second angled ramp-up length $L_{RU2}$. In certain example embodiments, as shown, the ramp-down length $L_{RD}$ may be equal to the intermediate length $L_{INT}$. In other example embodiments, the ramp-down length $L_{RD}$ may be different than the intermediate length $L_{INT}$.

As shown in FIGS. 5 and 6, the first part 32a has a first intermediate length $L_{INT1}$, and the second part 32b has a second intermediate length $L_{INT2}$. The intermediate length $L_{INT}$ is equal to the sum of the first intermediate length $L_{INT1}$ and the second intermediate length $L_{INT2}$. In certain example embodiments, as shown, the first intermediate length $L_{INT1}$ may be equal to the second intermediate length $L_{INT2}$. In other example embodiments, the first intermediate length $L_{INT1}$ may be different than the second intermediate length $L_{INT2}$.

The band saw blade 10 has a total circumferential blade length $L_{BLD}$ (not shown). The blade length $L_{BLD}$ may be equal to the pattern length $L_{PAT}$ multiplied by the number of back edge patterns 21 present along the back edge 16. In certain example embodiments, the blade length $L_{BLD}$ may be equal to or greater than approximately ten (10) feet (3.05 meters) and less than approximately fifteen (15) feet (4.57 meters), and the spacing length $L_{SP}$ may be equal to or greater than approximately one-third (⅓) of the ramp-up length $L_{RU}$ and less than or equal to approximately one and one-half (1.5) times the ramp-up length $L_{RU}$. In certain example embodiments, the blade length $L_{BLD}$ may be equal to or greater than approximately fifteen (15) feet (4.57 meters) and less than approximately twenty (20) feet (6.10 meters), and the spacing length $L_{SP}$ may be equal to or greater than approximately one-half (½) of the ramp-up length $L_{RU}$ and less than approximately two (2) times the ramp-up length $L_{RU}$. In certain example embodiments, the blade length $L_{BLD}$ may be equal to or greater than approximately twenty (20) feet (6.10 meters), and the spacing length $L_{SP}$ may be equal to or greater than approximately one-half (½) of the ramp-up length $L_{RU}$ and less than approximately three (3) times the ramp-up length $L_{RU}$. In certain example embodiments, the blade length $L_{BLD}$ may be equal to or greater than approximately 10 feet (3.05 meters) and less than approximately 14 feet (4.27 meters), and the spacing length $L_{SP}$ may be equal to or greater than the ramp-down length $L_{RU}$. In certain example embodiments, the blade length $L_{BLD}$ may be equal to or greater than approximately 10 feet (3.05 meters) and less than approximately 14 feet (4.27 meters), and the spacing length $L_{SP}$ may be equal to or greater than approximately one-third of the ramp-up length $L_{RU}$ and less than approximately one and one-half times the ramp-up length $L_{RU}$. In certain example embodiments, the blade length $L_{BLD}$ may be equal to or greater than approximately 14 feet (4.27 meters), and the spacing length $L_{SP}$ may be equal to or greater than the ramp-down length $L_{RU}$. It will be understood that the exact dimensions of the band saw blade 10 and the sections of the back edge 16 may vary according to various embodiments of the band saw blade 10.

As shown, the height of the band saw blade 10 may vary along the length of the back edge pattern 21. According to the example embodiment illustrated in FIGS. 1-4, the band saw blade has: (i) a first height $H_1$ at the leading end of the ramp-down section 22; (ii) a second height $H_2$ at the trailing end of the ramp-down section 22 and the leading end of the first angled ramp-up subsection 28; (iii) a third height $H_3$ at the trailing end of the first angled ramp-up subsection 28, along the intermediate subsection 32, and at the leading end of the second angled ramp-up subsection 30; and (iv) a fourth height $H_4$ at the trailing end of the second angled ramp-up subsection 30 and along the spacing section 26. In the example embodiment of FIGS. 1-4, the first height $H_1$ is equal to or substantially equal to the fourth height $H_4$; the first height $H_1$ is greater than each of the second height $H_2$ and the third height $H_3$; and the third height $H_3$ is greater than the second height $H_2$. In this manner, the first height $H_1$ and the fourth height $H_4$ are the maximum height of the band saw blade 10 along the back edge pattern 21, and the second height $H_2$ is the minimum height of the band saw blade 10 along the back edge pattern 21.

According to the example embodiment illustrated in FIGS. 5 and 6, the band saw blade has: (i) a first height $H_1$ at the leading end of the ramp-down section 22; (ii) a second height $H_2$ at the trailing end of the ramp-down section 22 and the leading end of the first angled ramp-up subsection 28; (iii) a third height $H_3$ at the trailing end of the first angled ramp-up subsection 28 and the leading end of the first part 32a of the intermediate subsection 32; (iv) a fourth height $H_4$ at the trailing end of the first part 32a of the intermediate subsection 32 and the leading end of the second part 32b of the intermediate subsection 32; (v) a fifth height $H_5$ at the trailing end of the second part 32b of the intermediate subsection 32 and the leading end of the second angled ramp-up subsection 30; and (vi) a sixth height $H_6$ at the trailing end of the second angled ramp-up subsection 30 and along the spacing section 26. In the example embodiment of FIGS. 5 and 6, the first height $H_1$ is equal to or substantially equal to the sixth height $H_6$; the first height $H_1$ is greater than each of the second height $H_2$, the third height $H_3$, the fourth height $H_4$, and the fifth height $H_5$; the third height $H_3$ is equal to or substantially equal to the fifth height $H_5$; the third height $H_3$ is greater than each of the second height $H_2$ and the fourth height $H_4$; and the fourth height $H_4$ is greater than the second height $H_2$. In this manner, the first height $H_1$ and the sixth height $H_6$ are the maximum height of the band saw blade 10 along the back edge pattern 21, and the second height $H_2$ is the minimum height of the band saw blade 10 along the back edge pattern 21.

Thus, in the example embodiments shown, the repeating back edge pattern 21 of the band saw blade 10 causes the height of the band saw blade 10 to vary in a repeating pattern along the length of the band saw blade 10. The forces with which the cutting edge 14 of the band saw blade 10 engages a workpiece (which also may be referred to as the "cutting forces") correspond at least in part to the height of the portion of the band saw blade 10 engaging the workpiece. Thus, during use of the band saw blade 10, the repeating back edge pattern 21 causes the cutting forces to vary according to a repeating pattern. The repeating and varying pattern of the cutting forces may aid in penetration of the cutting edge 14 into a workpiece, and thereby cutting, for example, materials that have a propensity to work-harden during cutting (e.g., Inconel® 718).

The repeating back edge pattern 21 of the band saw blade 10 also causes the height of a portion of the band saw blade 10 proximate one of the rollers 12 to vary in a repeating pattern relative to the height of a portion of the band saw blade 10 proximate another of the rollers 12. This, in turn, causes a portion of the cutting edge 14 proximate the rollers 12 to move in a repeating pattern relative to the cutting plane 18 defined by at least a substantial remainder of the cutting edge 14. Such movement also may aid in increasing penetration of the cutting edge 14 into a workpiece, and thereby cutting, for example, materials that have a propensity to work-harden during cutting (e.g., Inconel® 718).

Furthermore, the repeating back edge pattern 21 of the band saw blade 10 may aid in reducing the level of noise or squealing generated as the back edge 16 engages the rollers 12 and the cutting edge 14 engages the workpiece during use of the band saw blade 10. For example, the presence of the intermediate subsection 32 between the first angled ramp-up subsection 28 and the second angled ramp-up subsection 30 may reduce the level of noise or squealing generated as the ramp-up section 24 engages and travels along one of the rollers 12 causing a corresponding increase in cutting force applied by the cutting edge 14 to the workpiece. In effect, the intermediate subsection 32 may break up the increase in height of the band saw blade 10 (and the corresponding increase in cutting force applied by the cutting edge 14 to the workpiece) as the ramp-up section 24 engages and travels along one of the rollers 12.

The example band saw blade 10 may be used to cut a workpiece. A method for cutting a workpiece may include the steps of: (i) providing the band saw blade 10 described herein; (ii) providing a band saw machine including spaced rollers 12; and (iii) powering the band saw machine to move the band saw blade 10 in the cutting direction 20 while maintaining engagement of the back edge 16 of the band saw blade 10 with the spaced rollers 12, and while selectively engaging the workpiece with the cutting edge 14 of the band saw blade 10. In certain example embodiments, the workpiece may be formed of a material that has a propensity to work-harden during cutting. For example, the workpiece may be formed of Inconel® 718.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments. Finally, the term "plurality" means two or more, and when used in the description and/or claims indicates a plural number of respective elements.

That which is claimed is:

1. A band saw blade comprising:
    a cutting edge defining a cutting plane and configured to engage a workpiece during movement of the band saw blade in a cutting direction;
    a back edge located on an opposite side of the band saw blade relative to the cutting edge and defining a back edge pattern, the back edge pattern comprising, in sequential order in a direction opposite to the cutting direction:
        a ramp-down section having a ramp-down length and defining an acute ramp-down angle relative to a plane parallel to the cutting plane;
        a first ramp-up section having a first ramp-up length and defining a first acute ramp-up angle relative to the plane parallel to the cutting plane;
        an intermediate section having an intermediate length and oriented at least substantially parallel to the cutting plane, wherein the intermediate section is spaced a first distance from the cutting edge;
        a second ramp-up section having a second ramp-up length and defining a second acute ramp-up angle relative to the plane parallel to the cutting plane; and
        a spacing section having a spacing length and oriented at least substantially parallel to the cutting plane, wherein the spacing section is spaced a second distance from the cutting edge that is greater than the first distance.

2. The band saw blade of claim 1, wherein a sum of the first ramp-up length, the intermediate length, and the second ramp-up length is greater than each of the ramp-down length and the spacing length.

3. The band saw blade of claim 1, wherein the spacing length is greater than the ramp-down length.

4. The band saw blade of claim 1, wherein the first ramp-up length is equal to or substantially equal to the second ramp-up length.

5. The band saw blade of claim 1, wherein the ramp-down length is equal to or substantially equal to the intermediate length.

6. The band saw blade of claim 1, wherein the acute ramp-down angle is greater than each of the first acute ramp-up angle and the second acute ramp-up angle.

7. The band saw blade of claim 1, wherein the first acute ramp-up angle is equal to or substantially equal to the second acute ramp-up angle.

8. The band saw blade of claim 1, wherein the ramp-down section extends from a leading end of the back edge pattern to a second leading end of the first ramp-up section, wherein the first ramp-up section extends from a trailing end of the ramp-down section to a third leading end of the intermediate section, wherein the intermediate section extends from a second trailing end of the first ramp-up section to a fourth leading end of the second ramp-up section, wherein the second ramp-up section extends from a third trailing end of the intermediate section to a fourth leading end of the spacing section, and wherein the spacing section extends from a fourth trailing end of the second ramp-up section to a fifth trailing end of the back edge pattern.

9. The band saw blade of claim 1, wherein the band saw blade has a first height at a leading end of the ramp-down section, wherein the band saw blade has a second height at a trailing end of the ramp-down section and a second leading end of the first ramp-up section, wherein the band saw blade has a third height at a second trailing end of the first ramp-up section, along the intermediate section, and at a third leading end of the second ramp-up section, wherein the band saw blade has a fourth height at a third trailing end of the second ramp-up section and along the spacing section, wherein the first height is equal to or substantially equal to the fourth height, wherein the first height is greater than each of the second height and the third height, and wherein the third height is greater than the second height.

10. A band saw blade comprising:
a cutting edge defining a cutting plane and configured to engage a workpiece during movement of the band saw blade in a cutting direction;
a back edge located on an opposite side of the band saw blade relative to the cutting edge and defining a repeating back edge pattern, the back edge pattern comprising, in sequential order in a direction opposite to the cutting direction:
 a ramp-down section having a ramp-down length and defining an acute ramp-down angle relative to a plane parallel to the cutting plane;
 a ramp-up section having a ramp-up length and defining an acute ramp-up angle relative to the plane parallel to the cutting plane the ramp-up section comprising:
  a first ramp-up subsection having a leading end, a trailing end, and a first ramp-up length comprising a first portion of the ramp-up length and defining a first acute ramp-up angle relative to the plane parallel to the cutting plane;
  a second ramp-up subsection having a leading end, a trailing end, and a second ramp-up length comprising a second portion of the ramp-up length and defining a second acute ramp-up angle relative to the plane parallel to the cutting plane; and
  an intermediate subsection extending between the trailing end of the first ramp-up subsection and the leading end of the second ramp-up subsection and having an intermediate length comprising a third portion of the ramp-up length; and
 a spacing section having a spacing length and oriented parallel to the cutting plane;
wherein the ramp-up section is positioned adjacent to the ramp-down section;
wherein the spacing section is positioned adjacent to the ramp-up section; and
wherein the ramp-up length and the spacing length each are greater than the ramp-down length.

11. The band saw blade of claim 10, wherein the intermediate subsection is oriented at least substantially parallel to the cutting plane.

12. The band saw blade of claim 10, wherein the ramp-down length is equal to or substantially equal to the intermediate length.

13. The band saw blade of claim 10, wherein the first ramp-up length is equal to or substantially equal to the second ramp-up length, and wherein the first acute ramp-up angle is equal to or substantially equal to the second acute ramp-up angle.

14. The band saw blade of claim 10, wherein a total circumferential length of the band saw blade is equal to or greater than approximately 10 feet and less than approximately 14 feet, and wherein the spacing length is equal to or greater than approximately one-third of the ramp-up length and less than approximately one and one-half times the ramp-up length.

15. The band saw blade of claim 10, wherein a total circumferential length of the band saw blade is equal to or greater than approximately 14 feet, and wherein the spacing length is greater than the ramp-down length.

16. A band saw blade comprising:
a cutting edge defining a cutting plane and configured to engage a workpiece during movement of the band saw blade in a cutting direction;
a back edge located on an opposite side of the band saw blade relative to the cutting edge and defining a back edge pattern comprising, in sequential order in a direction opposite to the cutting direction:
 a ramp-down section having a ramp-down length and defining an acute ramp-down angle relative to a plane parallel to the cutting plane;
 a first ramp-up section having a first ramp-up length and defining a first acute ramp-up angle relative to the plane parallel to the cutting plane;
 an intermediate section having an intermediate length and oriented parallel to the cutting plane;
 a second ramp-up section having a second ramp-up length and defining a second acute ramp-up angle relative to the plane parallel to the cutting plane; and
 a spacing section having a spacing length and oriented at least substantially parallel to the cutting plane.

17. The band saw blade of claim 16, wherein a sum of the first ramp-up length, the intermediate length, and the second ramp-up length is greater than each of the ramp-down length and the spacing length.

* * * * *